US006909064B2

(12) United States Patent
Angel

(10) Patent No.: US 6,909,064 B2
(45) Date of Patent: Jun. 21, 2005

(54) PINCH WELD GUN WITH SWIVEL SHUNT CONNECTION

(75) Inventor: Jeffrey R. Angel, Lake Orion, MI (US)

(73) Assignee: Progressive Tool & Industries Co., Southfield, MI (US)

( * ) Notice: Subject to any disclaimer, the term of this patent is extended or adjusted under 35 U.S.C. 154(b) by 52 days.

(21) Appl. No.: 10/437,311

(22) Filed: May 13, 2003

(65) Prior Publication Data

US 2004/0195213 A1 Oct. 7, 2004

Related U.S. Application Data

(60) Provisional application No. 60/460,999, filed on Apr. 7, 2003.

(51) Int. Cl.[7] ............................................. B23K 11/24
(52) U.S. Cl. .................................................... 219/116
(58) Field of Search ............................ 219/86.25, 90, 219/116

(56) References Cited

U.S. PATENT DOCUMENTS

| | | | | |
|---|---|---|---|---|
| 4,410,782 A | * | 10/1983 | Konno et al. .................. 219/89 |
| 4,531,041 A | * | 7/1985 | Larsson ........................ 219/90 |
| 4,551,605 A | * | 11/1985 | Numata et al. .......... 219/86.31 |
| 4,559,438 A | * | 12/1985 | Nakadate et al. ............. 219/90 |
| 5,252,801 A | | 10/1993 | Angel et al. ............. 219/86.61 |
| 5,276,296 A | * | 1/1994 | Kawada et al. ............. 219/116 |
| 5,739,499 A | | 4/1998 | Suzio et al. ................... 219/90 |
| 6,469,272 B2 | | 10/2002 | Dugas et al. ............. 219/86.32 |
| 6,723,944 B1 | * | 4/2004 | Angel .......................... 219/90 |
| 2004/0045938 A1 | * | 3/2004 | Angel ..................... 219/86.25 |
| 2004/0045939 A1 | * | 3/2004 | Angel ......................... 219/116 |
| 2004/0045940 A1 | * | 3/2004 | Angel ......................... 219/116 |

FOREIGN PATENT DOCUMENTS

JP         58-107281      *  6/1983    ........... B23K/11/10

* cited by examiner

*Primary Examiner*—Kevin P. Kerns
(74) *Attorney, Agent, or Firm*—Young & Basile, P.C.

(57) ABSTRACT

A weld gun including a frame structure, a weld arm mounted on the frame structure, an electrode mounted on the weld arm and including an electrode cap at one end of the electrode, a transformer, and a shunt fixedly secured at one end thereof to another end of the electrode and fixedly secured at another end thereof to the transformer. The electrode is elongated and defines a longitudinal axis, the shunt end of the electrode defines a shunt mounting surface that is oblique with respect to the longitudinal electrode axis, and the electrode end of the shunt defines a mounting surface adapted to seat on the mounting surface of the electrode and operative when so seated to position the end portion of the shunt defining the electrode end of the shunt obliquely with respect to the longitudinal axis of the electrode whereby to reduce the total angular curvature of the shunt between the weld arm and the transformer and thereby reduce the stress and strain in the shunt produced by repeated operation of the weld gun with consequent longer shunt life.

26 Claims, 10 Drawing Sheets

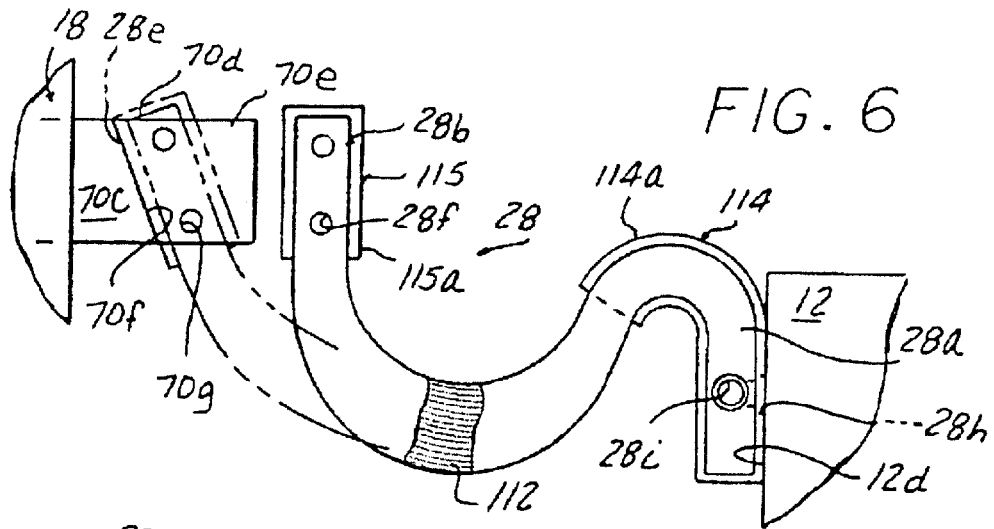
FIG. 6
FIG. 6A
FIG. 7
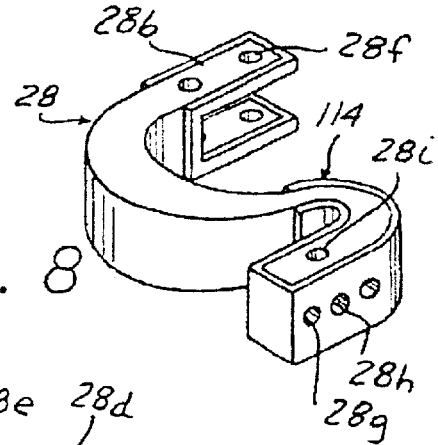
FIG. 8
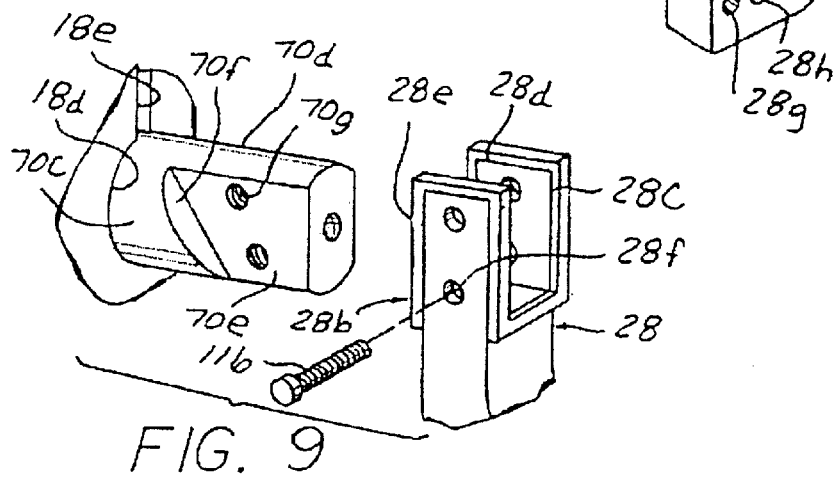
FIG. 9

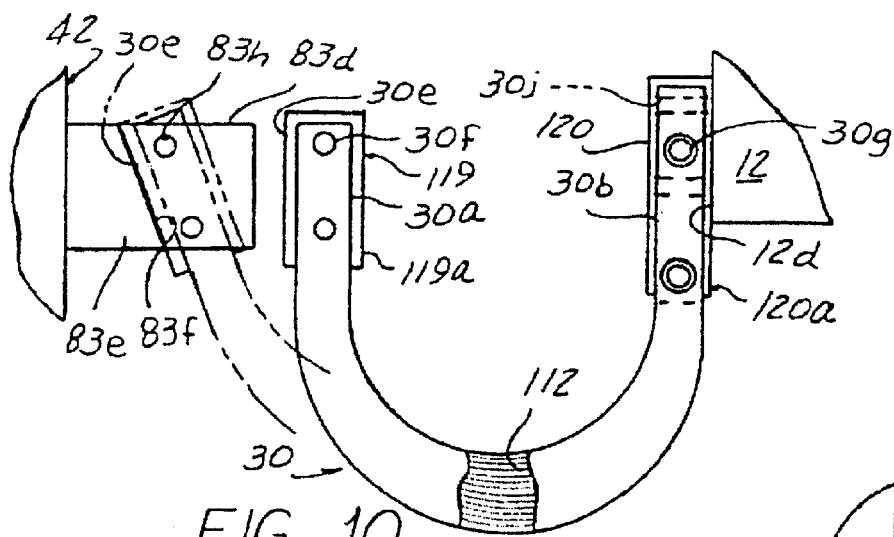
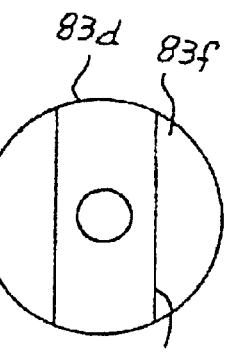
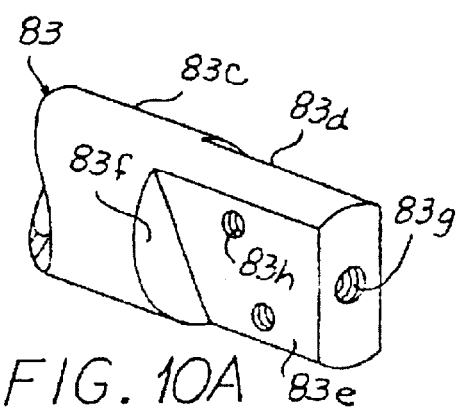
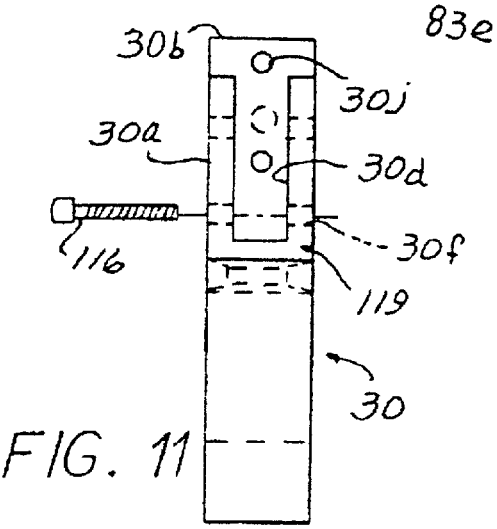
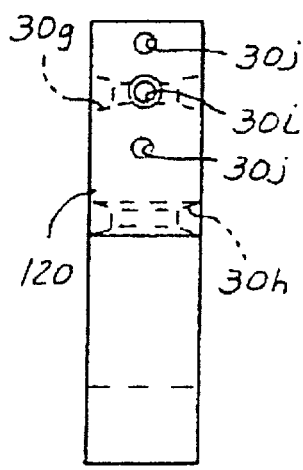
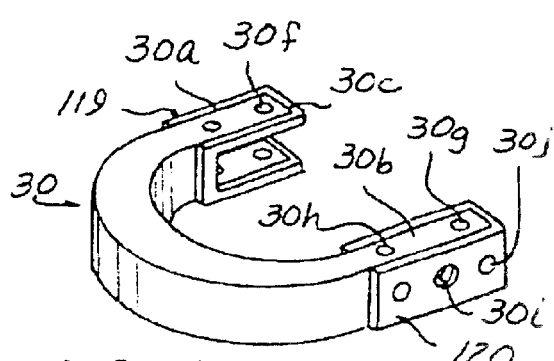

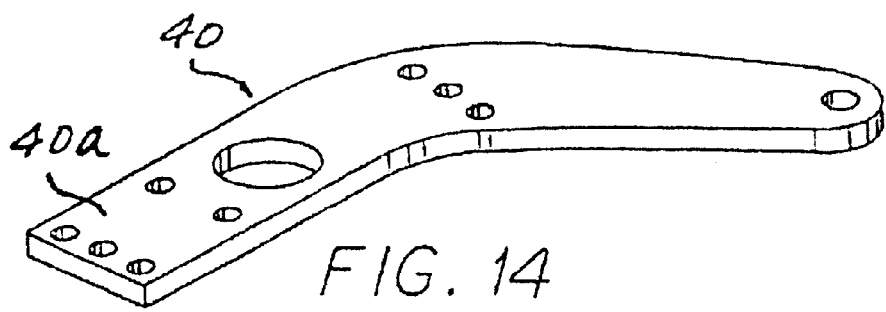
FIG. 14
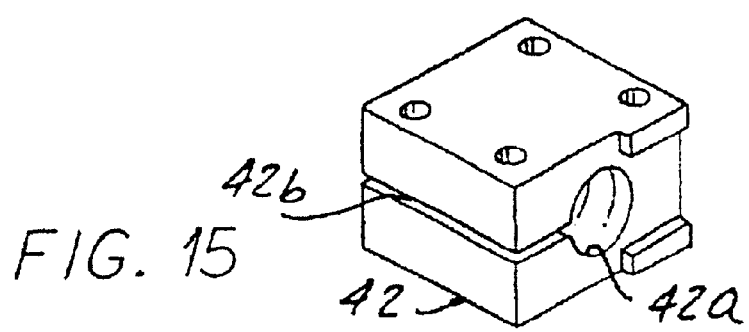
FIG. 15
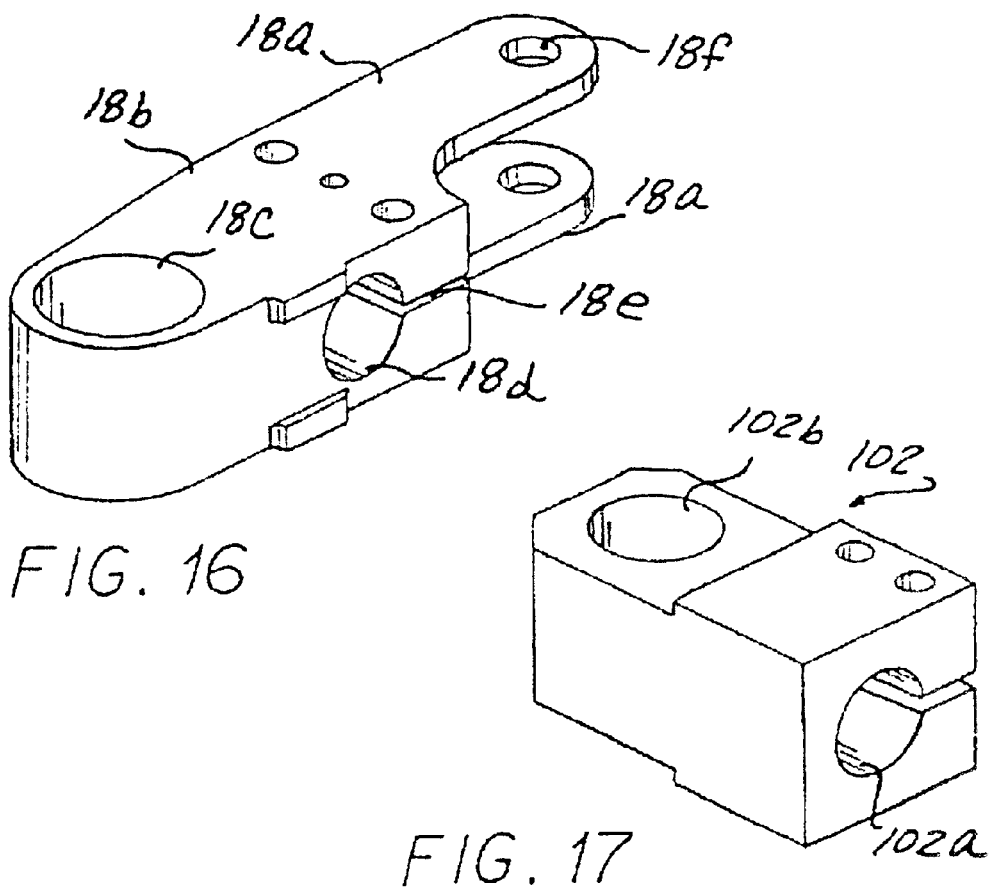
FIG. 16
FIG. 17

PINCH WELD GUN WITH SWIVEL SHUNT CONNECTION

This application claims the benefit of Provisional Application No. 60/460,999, filed Apr. 7, 2003.

FIELD OF THE INVENTION

This invention relates to weld guns and more particularly to weld guns especially suitable for use in industrial automotive applications.

BACKGROUND OF THE INVENTION

Weld guns are in common usage in many industrial applications and in particular in automotive applications. Whereas a myriad of weld gun designs have been proposed and/or utilized commercially, there is still a need for a simpler weld gun design, providing a less expensive cost of assembly; for a weld gun design that is easier to service, thereby reducing servicing costs; and for a weld gun design that provides a longer life, thereby reducing replacement costs.

SUMMARY OF THE INVENTION

This invention is directed to the provision of an improved weld gun.

More specifically, this invention is directed to the provision of a weld gun design that is simple, inexpensive and durable.

The invention relates to a weld gun of the type including a frame structure, an electrode mounted on the weld arm and including an electrode cap at one end of the electrode, a transformer, and a shunt fixedly secured at one end thereof to another end of the electrode and fixedly secured at another end thereof to the transformer.

According to an important feature of the invention, the electrode is elongated and defines a longitudinal axis; the shunt end of the electrode defines a shunt mounting surface that is oblique with respect to the longitudinal electrode axis; and the electrode end of the shunt defines a mounting surface adapted to seat on the mounting surface of the electrode and operative when so seated to position the end portion of the shunt defining the electrode end of the shunt obliquely with respect to the longitudinal axis of the electrode. This angled positioning of the shunt with respect to the associated electrode reduces the total angular curvature of the shunt between the electrode and the transformer and thereby reduces the stress and strain in the shunt produced by repeated operation of the weld gun with consequent longer shunt life.

According to a further feature of the invention, the electrode end of the shunt has a bifurcated configuration defining opposite confronting laterally spaced flat surfaces; the shunt end of the electrode defines opposite outwardly facing laterally spaced flat surfaces; and the distance between the laterally spaced flat surfaces on the electrode end of the shunt corresponds generally to the distance between the laterally spaced flat surfaces on the shunt end of the electrode so that the bifurcated end of the shunt may be swively positioned on the shunt end of the electrode. This specific geometry provides a ready an convenient means of providing the desired angled disposition of the shunt.

According to a further feature of the invention, the shunt end of the electrode defines a central portion defining the opposite, outwardly facing laterally spaced flat surfaces and further defines flat oblique shunt mounting surfaces, outwardly of and flanking the outwardly facing surfaces, constituting the oblique shunt mounting surface; and the bifurcated electrode end of the shunt is mounted on the central portion of the shunt end of the electrode with the mounting surface on the shunt seated against the oblique shunt mounting surfaces on the shunt end of the electrode. This specific geometry further facilitates the desired oblique mounting of the shunt.

According to a further feature of the invention, the shunt end of the electrode has a circular cross-sectional configuration; the outwardly facing surfaces are defined as chords of the circular cross-section; and the flat oblique surfaces are defined as chordal segments of the circular cross-section. This specific geometry further facilitates the desired oblique mounting of the shunt.

According to a further feature of the invention, the weld gun further includes fastener means passing through aligned apertures in the shunt end of the electrode and the electrode end of the shunt to fix the end portion of the shunt obliquely with respect to the longitudinal axis of the electrode.

BRIEF DESCRIPTION OF THE DRAWINGS

The description herein makes reference to the accompanying drawings wherein like reference numerals refer to like parts throughout the several views, and wherein:

FIGS. 6, 7, 8 and 9 are elevational, end, and perspective views of a first shunt utilized in the weld gun;

FIG. 6A is a detail view of a first electrode utilized in the weld gun;

FIGS. 10, 11, 12 and 13 are elevational, front end, rear end, and perspective views of a second shunt utilized in the weld gun;

FIGS. 10A and 10B are detail views of a second electrode utilized in the weld gun;

FIGS. 14–17 are detail views of component parts of the weld gun;

DETAILED DESCRIPTION OF THE PREFERRED EMBODIMENT

Figure 1:
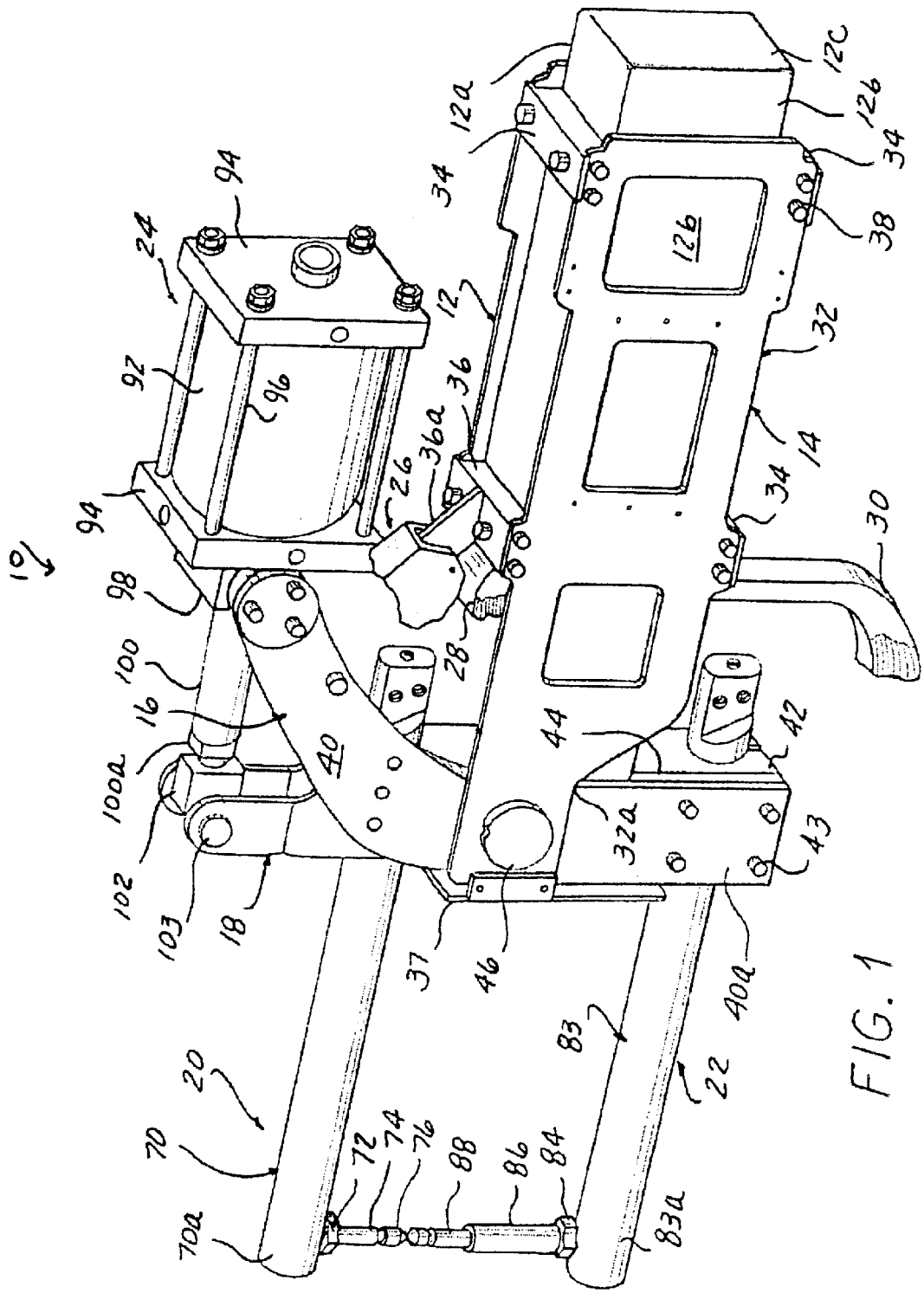
FIG. 1 is a perspective view of a weld gun according to the invention.
Figure 1A:
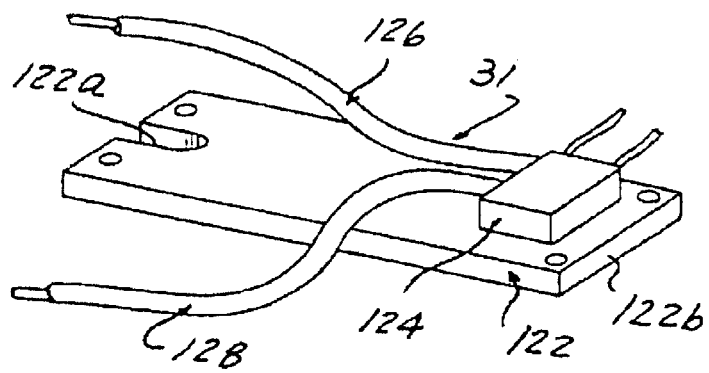
FIG. 1A is a perspective view of a coolant distributor assembly for the weld gun.

The weld gun 10 of the invention, broadly considered, includes, a transformer 12, a cage or cradle assembly 14, an outer weld arm assembly 16, an inner weld arm 18, an upper electrode assembly 20, a lower electrode assembly 22, a power cylinder assembly 24, a balancing cylinder assembly 26, an upper shunt 28, a lower shunt 30, and a coolant distributor assembly 31.

Figure 2:
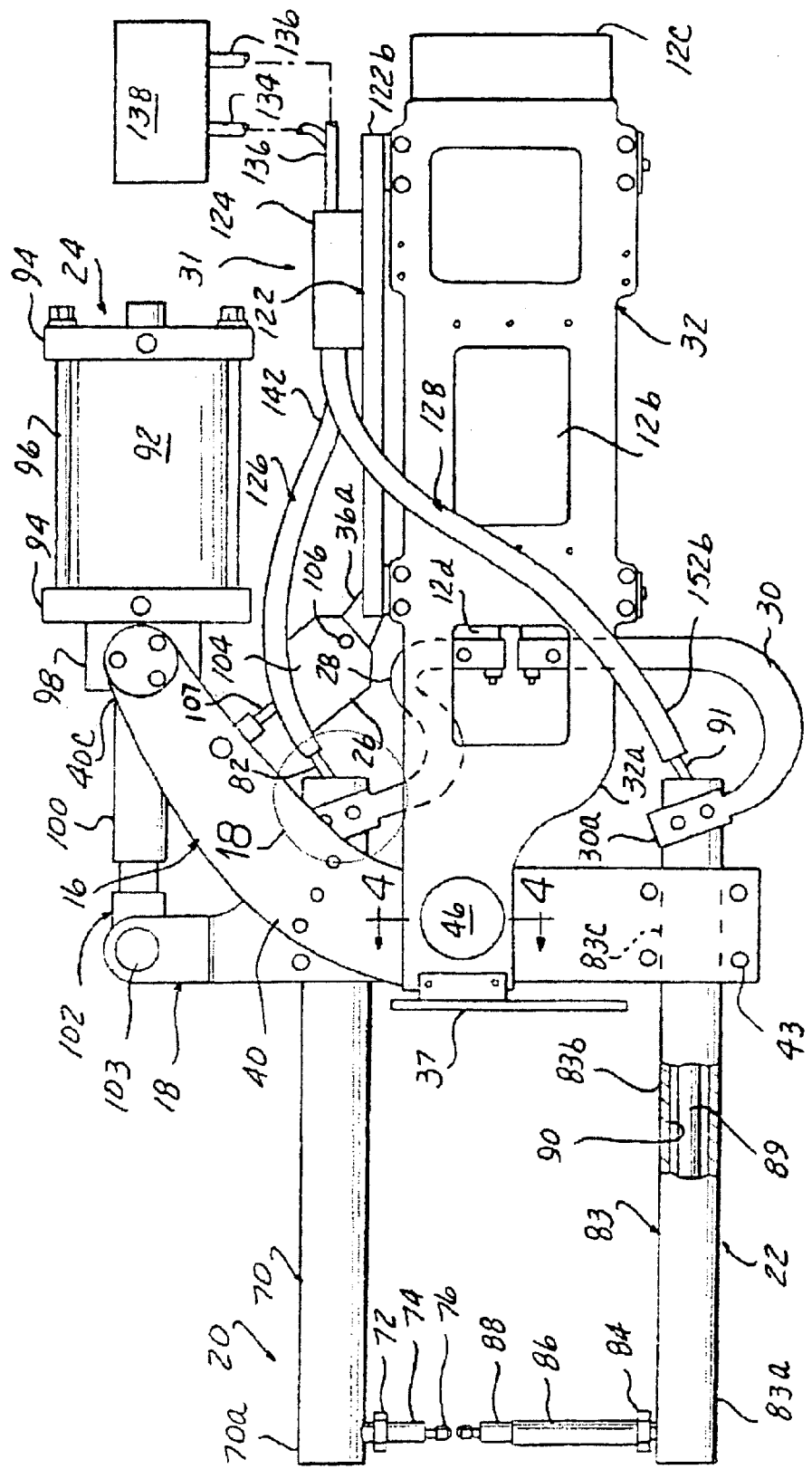
FIG. 2 is a side elevational view of the weld gun.
Figure 19:
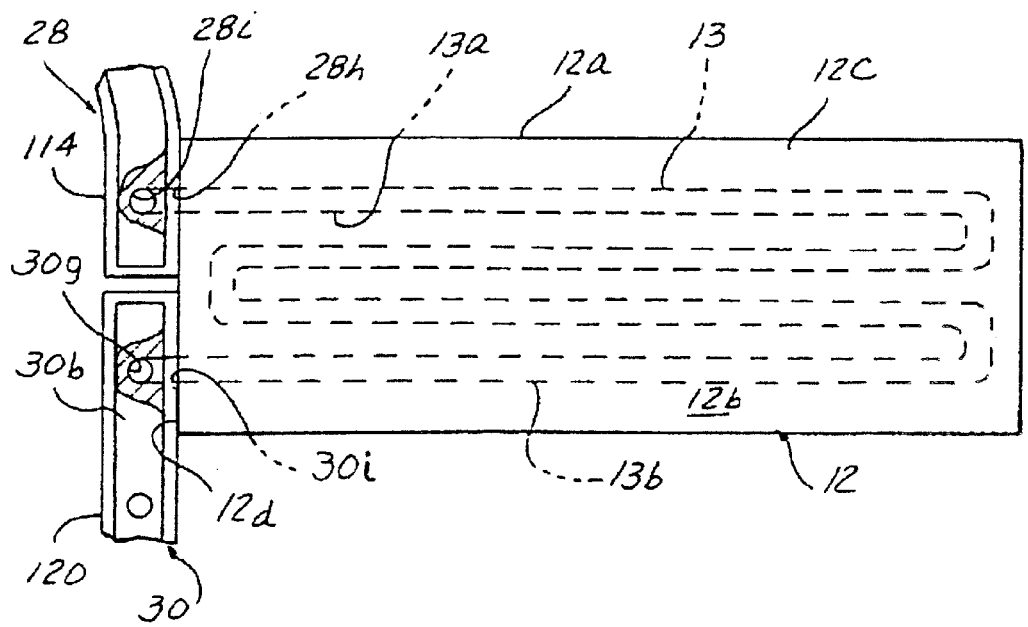
FIG. 19 is a detail view showing a transformer/shunt interface of the weld gun.
Figure 20:
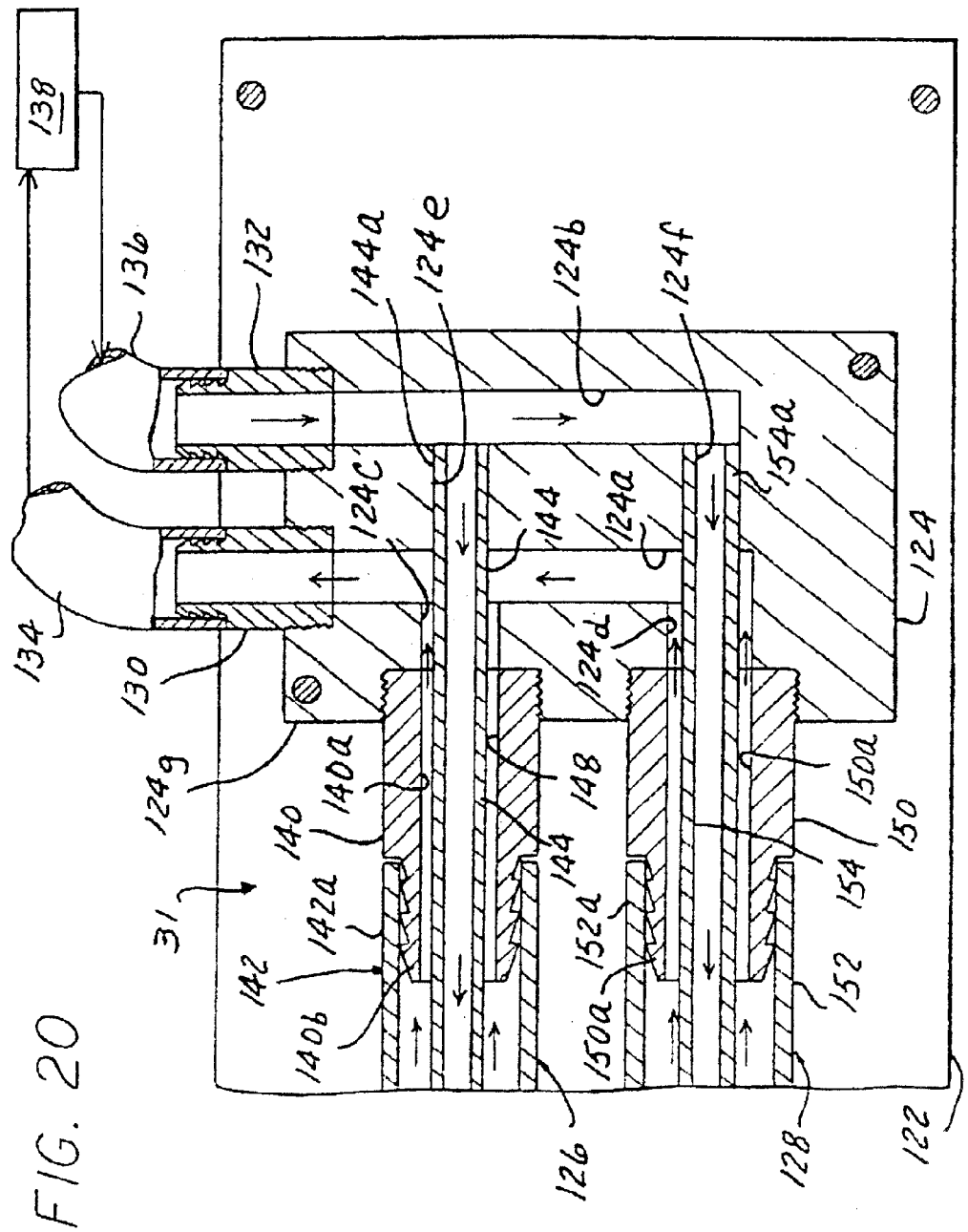
FIG. 20 is a cross-sectional view of a portion of the coolant distributor assembly seen in FIG. 1A.

Transformer 12 (FIGS. 1, 2 and 19) is of known form and has a monolithic rectangular configuration including a top face 12a, side faces 12b, a rear end 12c, and a front face 12d. Transformer 12 in known manner includes a coolant passage system 13 to facilitate the delivery of coolant to the transformer.

Figure 5:
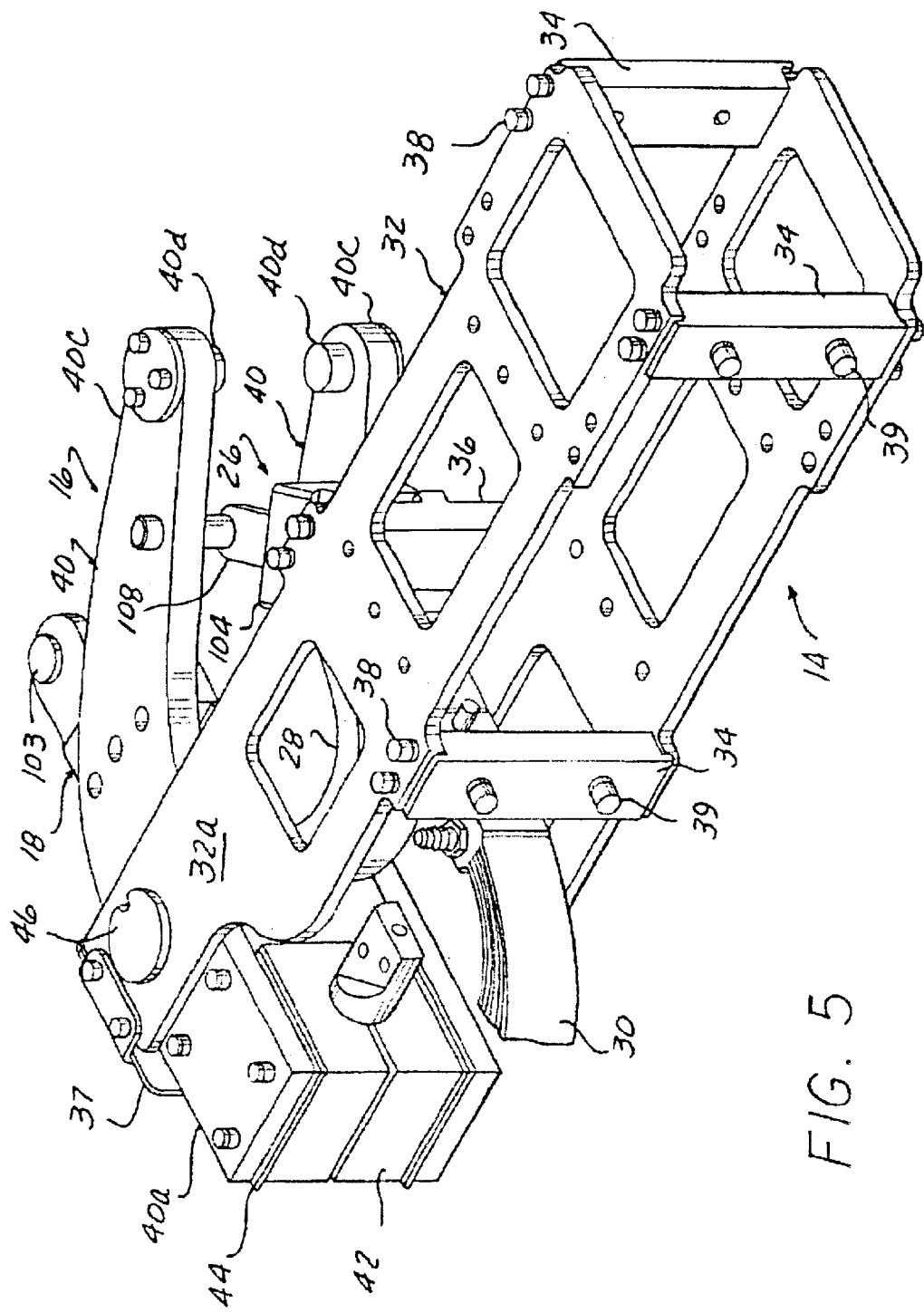
FIG. 5 is a perspective view of the basic skeletal structure of the weld gun.
Figure 18:
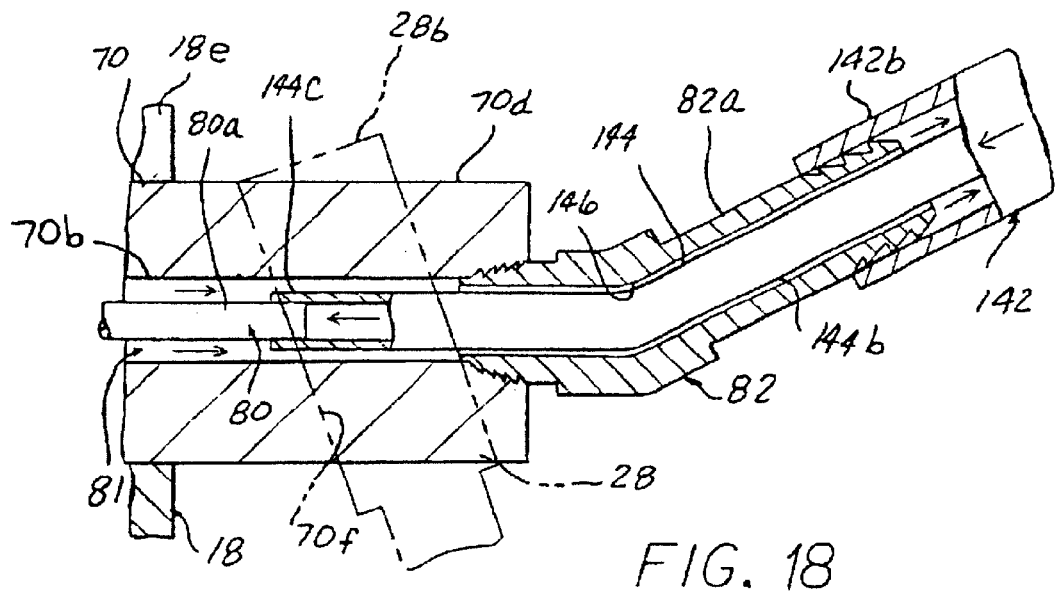
FIG. 18 is a fragmentary cross-sectional view taken within the circle 18 of FIG. 2.

Cage or cradle 14 (FIGS. 1, 2 and 5) is arranged to straddle the transformer and includes side plates 32, cross bars 34 and 36, and a front shield 37. Cage 14 fits around the transformer with forward bracket arm portions 32a of the side plates extending forwardly beyond the front face 12d of the transformer. Shield 37 is fixedly secured to and extends between the front ends of bracket portions 32a. Bolts 38 fixedly secure cross-bars 34, 36 to side plates 32 and set screws 39 fixedly mount the cage on the transformer.

Outer weld arm assembly 16 (FIGS. 1, 2, 5, 13 and 14) includes a pair of spaced arcuate side arms 40 and a holder block 42 fixedly positioned between the lower ends 40a of the side arms 40 via bolts 43. A pair of spacer plates 44 are positioned between the opposite faces of block 42 and the respective confronting inner faces of side arm lower end portions 40a.

Figure 4:
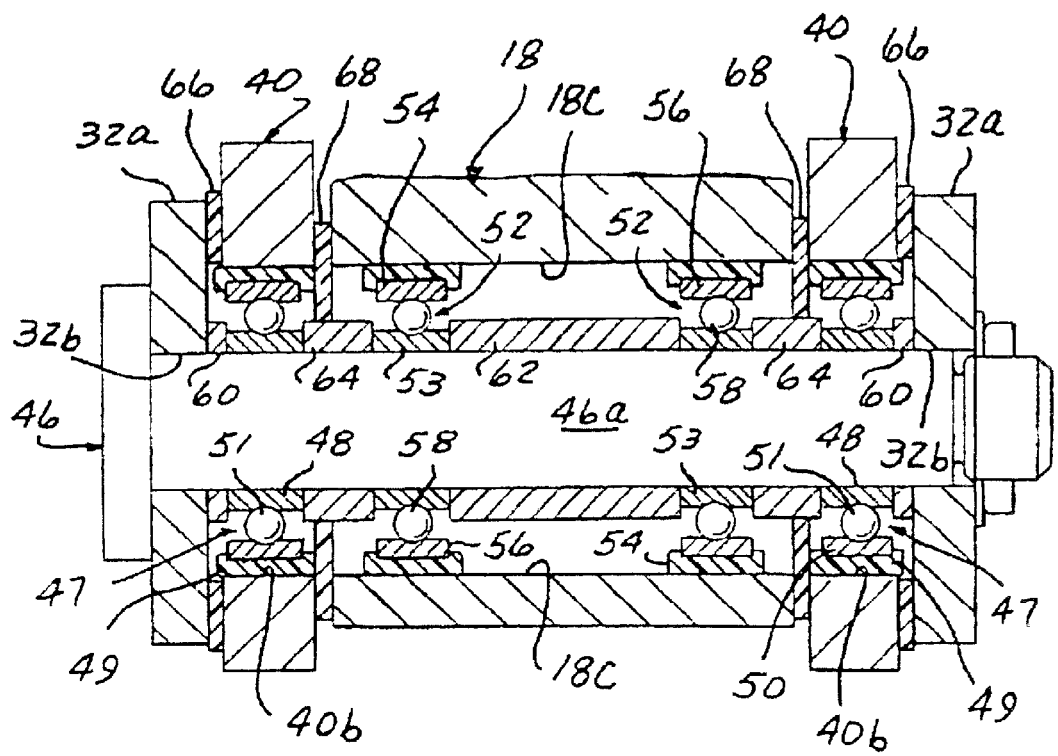
FIG. 4 is a cross-sectional view taken on line 4—4 of FIG. 2.

Side arms 40 are pivotally secured to the bracket arm portions 32a of the side plates of the cage via a clevis or pivot pin 46 passing through aligned apertures 32b (FIG. 4) in bracket arm portions 32a and through apertures 40b in the respective side plates. A ball bearing assembly 47 is positioned between each aperture 40b and the main body portion of 46a of the clevis pin 46. Each bearing assembly 47 includes an inner race 48 fixedly secured to pivot pin main body portion 46a, an annular dielectic member 49 (formed of a suitable insulative materials such for example as nylon) fixedly positioned within the respective aperture 40b and having an inwardly facing cup shaped configuration in cross-section; an outer race 50 fixedly secured within the annular cup defined by annular member 49, and a ball run 51 rolledly positioned between inner and outer races 48 and 50.

Inner weld arm 18 (FIGS. 1, 2, 5 and 16) has a devised upper configuration defined by spaced arm portions 18a and a monolithic lower main body portion 18b defining a lower cross bore 18c receiving pivot pin 46. The lower end 18b of arm 18 is pivoted on pivot pin 46 via spaced ball bearing assemblies 52 (FIG. 4) each including an inner race 53 fixedly secured to a respective portion of pivot pin main body portion 46a, an outer annular insulative member 54 fixedly positioned within bore 18c and having an inwardly facing cup shaped cross-sectional configuration, an outer race 56 fixedly positioned within the annular cup defined by annular member 54, and a ball race 58 rollably positioned between the inner and outer races.

An annular spacer 60 is positioned between the inner face of each bracket side arm portion 32a and the inner race of a respective bearing assembly 47; an annular spacer 62 is positioned between the inner races 53 of the respective bearing assemblies 50; and annular spacers 64 are positioned between the inner race of each bearing assembly 47 and the inner race of the respective bearing assembly 52. Insulative annular shims 66 are positioned between the inner faces of bracket arm portions 32a and the respective side arms 40 and further insulative annular shims 68 are positioned between the inner face of each side arm 40 and a respective outer face of inner arm 18. Bearings 47 and 52, in coaction with spacers 60, 62 and 64 and shims 66 and 68 will be seen to provide a robust journaling of the outer arms 40 and the inner arm 18 on the pivot pin 46 while providing effective electrical insulation between the arms and the cage structure.

Upper electrode assembly 20 (FIGS. 1, 2, 9 and 18) includes an electrode 70 of circular cross section, a hex adapter 72 secured to the free front end 70a of the electrode, a cap adapter 74 connected to hex adapter 72, an electrode cap or weld tip 76 connected to cap adapter 74, and a central coolant tube 80 positioned concentrically in a central axial passage 70b in electrode 70. Coolant tube 80 coacts with passage 70b to define concentric axially extending coolant fluid passages including a central inner passage defined within tube 80 and an annular outer passage 81 defined between passage 70b and tube 80. It will be understood that, in known manner, the concentric coolant fluid passages extend through hex adapter 72, and cap adapter 74 whereby to deliver coolant fluid to weld tip 76 and return coolant fluid from the tip. For example, coolant fluid may be delivered via inner tube 80 and return flow may be provided via annular outer passage 81.

The rear end 70c of electrode 70 is clampingly received in a bore 18d defined in arm 18 with clamping accomplished via a split 18e in the arm coacting with suitable fasteners passing through and interconnecting the sides of the arm on opposite sides of the split. An angled fitting 82 is threadably received in a reduced thickness rear fitting portion 70d of electrode 70. Rear fitting portion 70d defines opposite flats 70e and is joined to rear end 70c via opposite angled flats 70f. Angled flats 70f comprise chordal segments and are preferably angled with respect to the vertical by between 10° and 20°.

Lower electrode assembly 22 (FIGS. 1, 2 and 10A) includes an electrode 83 of circular cross section, a hex adapter 84 connected to the free front end 83a of electrode 83, a cap adapter 86, an electrode cap or weld tip 88 connected to cap adapter 86, and a central coolant tube 89 positioned concentrically in a central axial passage 83b in electrode 83. Coolant tube 89 coacts with passage 83b to define concentric axially extending coolant fluid passages including a central inner passage defined within tube 89 and an annular outer passage 90 defined between passage 83b and tube 89. It will be understood that, in known manner, the concentric coolant fluid passages extend through hex adapter 84 and cap adapter 86 whereby to deliver coolant fluid to weld tip 88 and return coolant fluid from the tip. For example, coolant fluid may be delivered via inner tube 89 and return flow may be provided via annular outer passage 90. The rear end 83c of electrode 83 is clampingly received in an aperture 42a in holder 42 with a split 42b in the lower end of the holder coacting with fasteners 43 to effect the clamping action. An angled fitting 91 (identical to fitting 82) is threadably received in a threaded central aperture 83g in a reduced thickness rear fitting portion 83d of electrode 83. Rear fitting portion 83d defines opposite flats 83e and is joined to rear end 83c via opposite angled flats 83f. Angled flats 83f comprise chordal segments and are preferably angled with respect to the vertical by between 10° and 20°.

Figure 3:
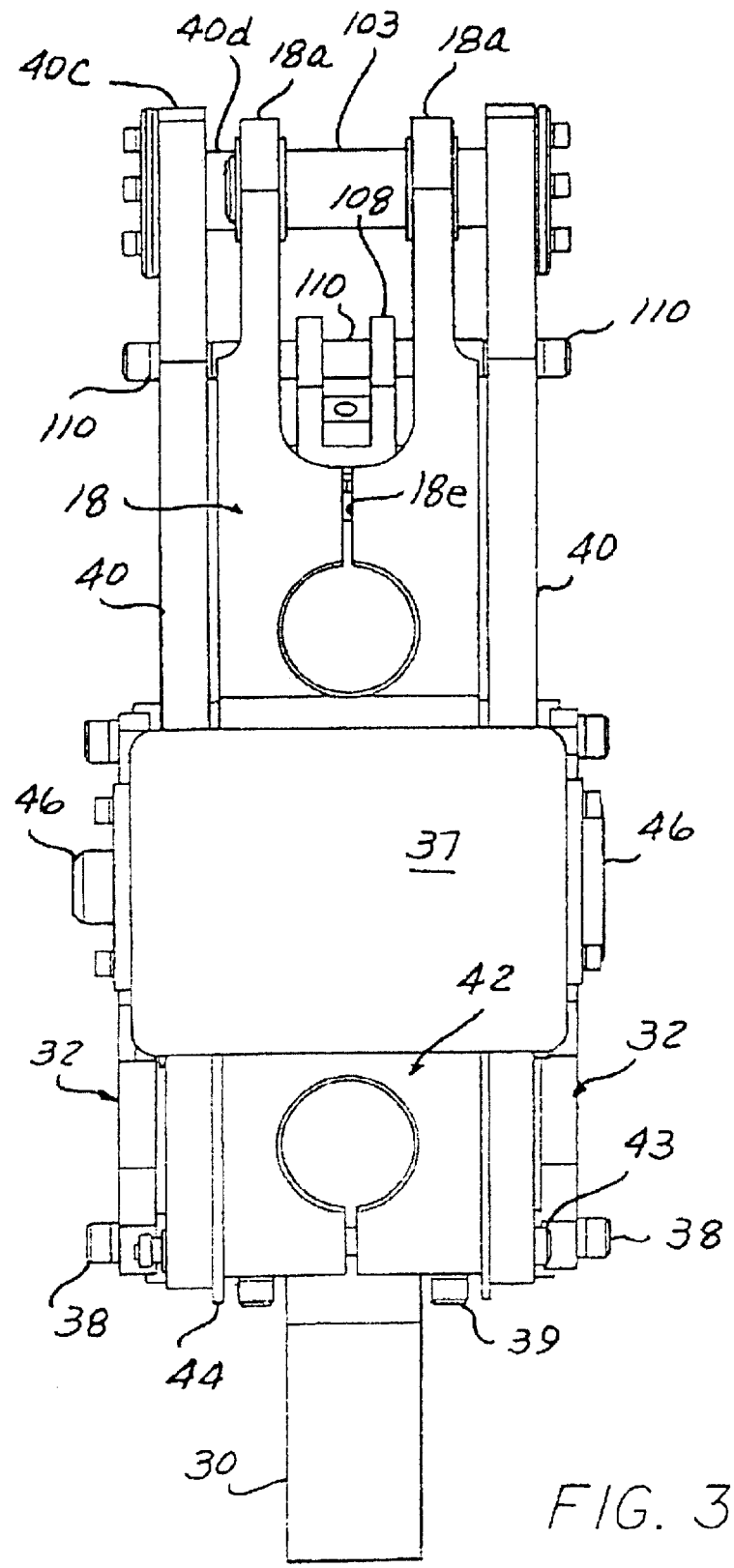
FIG. 3 is an end view of the weld gun.

Power cylinder assembly 24 (FIGS. 1, 2 and 17) includes a cylinder main body 92 clampingly positioned between end plates 94 via tie rods 96, a mounting block 98 provided on the front face of front end plate 94, a piston rod 100 connected in known manner with a piston received within the cylinder body 92, and a cylinder rod end 102. The front end 100a of piston rod 100 is clampingly received in a bore 102a in the rear face of cylinder rod end 102 and a bore 102b in the forward end of rod end 102 receives a pivot pin 103 passing through apertures 18f in spaced clevis upper arm portions 18a of inner arm 18 to pivotally mount the front end of the piston rod to the upper end of the inner arm 18. Power cylinder assembly 24 may for example comprise a hydraulic cylinder assembly. The upper ends 40c of outer arms 40 define trunnions 40d (FIGS. 3 and 5) which are journaled in suitable sockets in cylinder mounting block 98 to pivotally connect the upper ends of arms 40 to the power cylinder assembly 24.

Balancing cylinder assembly 26 (FIGS. 1, 2, 3 and 5) may comprise, for example, an air cylinder and includes a cylinder body 104 pivotally mounted by a pin 106 on a bracket portion 36a of cage cross bar 36, a piston rod 107 suitably connected to the piston within cylinder 104, and a clevis 108 fixedly secured to the upper free end of a piston rod 107 and carrying a cross rod 110 journaled at its opposite ends in suitable apertures in spaced arms 40 whereby to pivotally mount the upper end of piston rod 107 with respect to arms 40.

Upper shunt 28 (FIGS. 1, 2, 5, 6, 7, 8, 9, 18 and 19) has a serpentine or "S" configuration and has a laminated copper construction whereby to provide a flexible electrical interconnection between the transformer and upper electrode assembly 20. Shunt 28 is formed of a plurality (for example 95) of elongated strips of copper 112 which are suitably weldingly fused together at their opposite ends 28a and 28b but are unsecured intermediate the fused ends so that they are free to flex between the fused ends. Fused end 28a is encased in a serpentine clip 114 and fused end 28b is encased in a clip 115. Shunt end 28b has a bifurcated configuration and defines a pair of laterally spaced arms 28c defining confronting laterally spaced flat inner faces 28d. The lateral spacing between faces 28d correspond generally to the lateral spacing between flats 70e on electrode fitting portion 70d so that the bifurcated end 28b of the shunt may be positioned over fitting portion 70d with faces 28d slidably positioned against flats 70e whereafter the shunt end may be swiveled or rotated to bring the leading edges 28e of arms 28c into seating, abutting engagement with angled flats 70f whereafter suitable fasteners 116 may be passed through aligned openings 28f/28f in arms 28c and 70g/70g in electrode end portion 70d whereby to fixedly secure the shunt end to the electrode end with the shunt end in the angled, dash line position seen in FIG. 6.

Shunt end 28a is provided with suitable bolt apertures 28g to fixedly secure the shunt end to the front face 12d of the transformer and is further provided with a longitudinal coolant passage 28h communicating with a transverse cross bore 28i. Passage 28h in turn communicates with an inlet/outlet end 13a of transformer coolant passage system 13 whereby to facilitate the delivery of a suitable cooling fluid to the transformer coolant system via cross-bore 28i and passage 28h. It will be understood that clips 114 and 115 are suitably formed and apertured to conform to and accommodate the form and apertures of the corresponding ends of the shunt. In practice, clips 114, 115 are positioned over the respective ends 28a/28b of the shunt prior to the fusion welding operation so that the fusion welding together of the copper strips at the respective end also serves to fuse the clip to the respective end whereafter the fused end may be machined to form the various apertures and bores. It will be understood that the inboard ends 114a/115a of the clips clampingly engage the outboard ends of insulative strips (not shown) positioned above and below the copper strips to protect the shunt and preclude inadvertent electrical contact of the shunt with other elements of the weld gun.

It will be seen that the swivel connection of shunt end 28b to electrode 70, enabling the angled connection of the shunt end to the electrode seen in dash lines in FIG. 6, has the effect of reducing the total angular curvature of the shunt between weld arm 18 and transformer face 20d. This reduction in total curvature in turn has the effect of reducing the stress and strain occurring in the shunt in response to repeated pivotal movements of the weld arm 18 with the result that fatigue rupturing of the individual copper strips of the shunt is minimized with resultant increase in shunt life. Since shunt failure is one of the most common failure modes in a weld gun, increasing the shunt life significantly reduces the maintenance requirements of the gun.

Lower shunt 30 (FIGS. 1, 2, 5, 10, 11, 12, 13 and 19) has a generally U-shaped configuration and is formed of a plurality (for example 95) of elongated copper strips 112 which are suitably fused together at their opposite ends 30a and 30b but are unsecured intermediate the fused ends so they are free to flex between the fused ends. Fused end 30a is encased in a clip 119 and fused end 30b is encased in a clip 120.

End 30a has a bifurcated configuration defining a pair of laterally spaced arms 30c defining confronting laterally spaced flat inner faces 30d. The lateral spacing between faces 30d corresponds generally to the lateral spacing between flats 83e on electrode fitting portion 83d so that the bifurcated end 30b of the shunt may be positioned over electrode fitting portion 83d with faces 30d slidably positioned against flats 83e whereafter the shunt end may be swiveled or rotated to bring the leading edges 30e of arms 30b into seating, abutting engagement with angled flats 83f whereafter suitable fasteners 116 may be passed through aligned openings 30f/30f in arms 30c and 83h/83h in electrode fitting portion 83d whereby to fixedly secure the shunt end to the electrode end with the shunt end in the angled, dash line disposition seen in FIG. 10.

End 30b is provided with a pair of vertically spaced cross-bores 30g and 30h. Upper cross-bore 30g communicates with a coolant passage 30i. End 30b is secured to the front face 12d of the transformer immediately below the end 28a of the upper shunt utilizing suitable fasteners passing through apertures 30j. Thus positioned, cooling passage 30i communicates with an inlet/outlet end 13b of transformer coolant passage system 13 so that a cooling fluid may be circulated through bore 28i of the upper shunt, through passage 28h to coolant system inlet/outlet 13a, routed in cooling fashion around the transformer through coolant system 13, returned via inlet/outlet 13b to passage 30i of lower shunt 30, and discharged through cross bore 30g of the lower shunt, whereby to provide a continuous flow of cooling fluid to and through the transformer and to the electrical interfaces between the shunts and the transformer. If desired or required, further cooling fluid flow may be provided through cross bore 30h.

It will be understood that clips 119 and 120 are suitably formed and apertured to conform to and accommodate the form and apertures of the corresponding ends of shunt 30. In practice, clips 119 and 120 are positioned over the respective end 30a/30b of the shunt prior to the fusion welding operation so that the fusion welding together of the copper strips at the respective end also serves to fuse the clip to the respective end whereafter the fused end may be machined to form the various apertures and bores. It will be understood that the inboard ends 119a/120a of the clips clampingly engage the outboard ends of insulative strips (not shown) positioned above and below the copper strips to protect the shunt and preclude inadvertent electrical contact of the shunt with other elements of the weld gun.

As with shunt 28, it will be seen that this swivel connection of shunt end 30a to electrode 83, enabling the angled connection of the shunt end to the electrode seen in dash lines in FIG. 10, has the effect of reducing the total angular curvature of the shunt between weld arm 16 and transformer face 20d. This reduction in total curvature in turn has the effect of reducing the stress and strain occurring in the shunt in response to repeated pivotal movements of the weld arm 16 with the result that fatigue rupturing of the individual copper strips of the shunt is minimized with resultant increase in shunt life. As previously noted, since shunt failure is one of the most common failure modes in a weld gun, increasing the shunt life significantly reduces the maintenance requirements of the gun.

Coolant distributor assembly 31 (FIGS. 1, 2, 18 and 20) includes a mounting plate 122, a distributor block 124, and concentric tubing assemblies 126 and 128.

Mounting plate 122 has a rectangular configuration and is sized to be fixedly mounted via suitable fastener devices on top of cradle 14 in overlying relation to transformer 12. The plate may extend for example from the rear top cross bar 34 to the front top cross bar 36 and may provide a notch 122a to accommodate the bracket portion 36a of cage cross bar 36.

Distributor block 124 has a monolithic configuration and is mounted on the top face of mounting plate 122 proximate the rear edge 122b of the plate. Block 124 defines parallel transverse bores 124a and 124b, parallel axial bores 124c and 124d, and further parallel axial bores 124e and 124f in respective axial alignment with bores 124c and 124d.

Threaded fittings 130 and 132 communicate with one end of transverse passages 124a and 124b respectively and receive hoses 134 and 136 which extend to suitable inlet and outlet ports of a source 138 of cooling liquid. This arrangement allows cooling liquid to be supplied for example from source 138 to passage 124b and returned to the source 138 via passage 124a.

Concentric tubing assembly 126 includes a fitting 140, a hose 142 and a central tube 144.

Fitting 140 is threadably received in a front face 124g of block 124 with its inner diameter 140a coextensive with bore 124c. Hose 142 is received at one end 142a over the barbed end 140b of fitting 140 and extends forwardly to a front end 142b which is fitted over the barbed, angled end 82a of fitting 82. Central tube 144 is press fit at a rear end 144a thereof in passage 124e and extends forwardly across passage 124a, through passage 124c, and through the central passage of the fitting 140 whereafter it extends forwardly and concentrically within and through hose 142 to its forward end 144b which is fitted concentrically within fitting 82 and which connects telescopically at the extreme forward end 144c thereof with the rear end 80a of tube 80. Tube 144 is spaced radially from fitting 82 to define an annular passage 146 between the tube and the fitting and is spaced radially from fitting 140 to define an annular passage 148 between the tube and the fitting.

It will seen that a coolant flow passage is thereby established between coolant liquid source 138 and welding tip 76 via hose 136, fitting 132, passage 124b, tube 144 and tube 80 and that a continuous return flow passage is established between weld tip 76 and source 138 via annular passage 81, annular passage 146, the annular space between hose 142 and tube 144, annular passage 148, passage 124c, passage 124a, fitting 130 and hose 134.

Concentric tubing assembly 128 includes a fitting 150, a hose 152, and a central inner tube 154. Fitting 150 is threadably received in the front face 124d of distributor block 124 with the inner diameter 150a of the fitting coextensive with passage 124d; one end 152a of hose 152 is fitted over the barbed end 150a of fitting 150; the other end 152b of the hose is fitted (FIG. 2) over the barbed end of angled fitting 91; and the rear end 154a of tube 154 is press fit in passage 124f and extends forwardly across passage 124a, through passage 124d, through fitting 150 and concentrically within hose 152 to a front end (not shown) which is telescopically coupled to the rear end of tube 89. As with the tubing assembly 126, central tube 154 is spaced radially throughout its length from the surrounding hardware so as to define a continuous annual passage between weld tip 88 and source 138 and define a continuous central passage between source 138 and weld tip 88 whereby to allow the provision of recirculating flow of coolant fluid from the source to the weld tip. As with the concentric tubing assembly 126, the flow from the source 138 to the weld tip 88 may be through a passage 124b, central tube 154, and central tube 89, and the return flow may be via the annular passageways defined around central tube 89, and central tube 154 and finally via passage 124a and hose 134 to source 138.

In a typical operation of the invention welding gun, the gun is attached to a robot (for example by attaching the robot to the cage 14); gross adjustment of the overall welding gun is performed utilizing the robot; and the upper and lower electrode caps are moved against opposite faces of a workpiece to be welded by simultaneous actuation of power cylinder 24 and air cylinder 26.

The weld gun of the invention provides many important advantages as compared to prior art weld guns. Specifically, the use of a shunt incorporating built in cooling passages for delivery of coolant to the transformer simplifies the construction of the gun and reduces the cost of the gun; the use of shunts having a swivel connection to the respective electrode allows the electrode end of each shunt to be swivelled to a position that is angled with respect to the associated weld arm whereby to reduce the total angular curvature of the shunt between the weld arm and the transformer and thereby reduce the stress and strain in the shunt produced by repeated operation of the weld gun with consequent longer shunt life; the use of an electrically insulated ball bearing at the central pivot of the gun provides a more robust construction as compared to prior art sleeve bushing constructions while yet providing the required electrical insulation between the electrodes and the main frame of the gun; the gun design allows the ready interchange of the power cylinder with a servo motor of known configuration; the use of a distributor block at a location remote from the electrodes in combination with concentric tubing extending from the distributor block to the electrodes minimizes the volume of tubing required to provide the cooling function and thereby simplifies the gun both structurally and operationally; the use of identical side plates to establish all of the critical dimensions of the components of the gun insures that tolerances will be maintained on all of the critical dimensions and at all of the critical points; and the use of identical side plates further simplifies reconfiguration of the gun since the shape and the configuration of the side plates may be changed to accommodate a different welding requirement while continuing to utilize much of the same componentry of the welding gun in the new configuration.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A weld gun including a frame structure, a weld arm mounted on the frame structure, an electrode mounted on the weld arm and including an electrode cap at one end of the electrode, a transformer, and a shunt fixedly secured at one end thereof to another end of the electrode and fixedly secured at another end thereof to the transformer, characterized in that:

the electrode end of the shunt has a bifurcated configuration defining opposite confronting laterally spaced flat surfaces;

the shunt end of the electrode defines opposite outwardly facing laterally spaced flat surfaces; and the distance between the laterally spaced flat surfaces on the electrode end of the shunt corresponds generally to the distance between the laterally spaced flat surfaces on the shunt end of the electrode so that the bifurcated end of the shunt may be swively positioned on the shunt end of the electrode.

2. A weld gun according to claim 1 wherein:

the electrode is elongated and defines a longitudinal axis; and the shunt end of the electrode defines a central portion defining the opposite laterally spaced flat surfaces and further defines flat oblique shunt mounting surfaces flanking the outwardly facing surfaces and oblique with respect to the longitudinal electrode axis.

3. A weld gun according to claim 2 wherein:
the shunt end of the electrode is a circular cross-sectional configuration;
the outwardly facing surfaces are defined on chords of the circular cross-section; and
the flat oblique surfaces are defined as chordal segments of the circular cross-section.

4. A weld gun according to claim 3 wherein the flat oblique surfaces lie in a plane that is perpendicular to the planes of the flat outwardly facing surfaces and oblique with respect to the longitudinal electrode axis.

5. A weld gun according to claim 4 wherein the weld gun further includes fastener means passing through aligned apertures in the shunt end of the electrode and the electrode end of the shunt to fix the end portion of the shunt obliquely with respect to the longitudinal axis of the electrode.

6. An electrode and shunt assembly for use with a weld gun including a frame structure, a weld arm mounted on the frame structure, an electrode mounted on the weld arm and including an electrode cap at one end of the electrode, a transformer, and a shunt fixedly secured at one end thereof to another end of the electrode and fixedly secured at another end thereof to the transformer, characterized in that:
the end of the shunt secured to the electrode has a bifurcated configuration defining opposite confronting laterally spaced flat surfaces;
the end of the electrode to which the shunt is secured defines opposite outwardly facing laterally spaced flat surfaces; and
the distance between the laterally spaced flat surfaces on the end of the shunt corresponds generally to the distance between the laterally spaced flat surfaces on the end of the electrode so that the bifurcated end of the shunt may be swively positioned on the end of the electrode.

7. An electrode and shunt assembly according to claim 6 wherein:
the electrode is elongated and defines a longitudinal axis;
the shunt end of the electrode defines a shunt mounting surface that is oblique with respect to the longitudinal electrode axis;
the electrode end of the shunt defines a mounting surface adapted to seat on the mounting surface of the electrode and operative when so seated to position the end portion of the shunt defining the electrode end of the shunt obliquely with respect to the longitudinal axis of the electrode.

8. An electrode and shunt assembly according to claim 7 wherein the shunt end of the electrode defines a central portion defining the opposite outwardly spacing laterally spaced flat surfaces and flat oblique surfaces outwardly of and flanking the outwardly facing surfaces constituting the oblique shunt mounting surface.

9. An electrode and shunt assembly according to claim 8 wherein:
the shunt end of the electrode has a circular cross-sectional configuration;
the outwardly facing surfaces are defined on chords of the circular cross-section; and
the flat oblique surfaces are defined as chordal segments of the circular cross-section.

10. An electrode and shunt assembly according to claim 9 wherein:
the flat oblique surfaces lie in a plane that is perpendicular to the planes of the flat outwardly facing surfaces and oblique with respect to the longitudinal electrode axis.

11. An electrode and shunt assembly according to claim 10 wherein the electrode and shunt assembly further includes fastener means passing through aligned apertures in the shunt end of the electrode and the electrode end of the shunt to fix the end portion of the shunt obliquely with respect to the longitudinal axis of the electrode.

12. An electrode and shunt assembly for use with a weld gun including a frame structure, a weld arm mounted on the frame structure, an electrode mounted on the weld arm and including an electrode cap at one end of the electrode, a transformer, and a shunt fixedly secured at one end thereof to another end of the electrode and fixedly secured at another end thereof to the transformer, characterized in that:
the electrode is elongated and defines a longitudinal axis;
the shunt end of the electrode defines opposite outwardly facing laterally spaced flat surfaces and flat mounting surfaces, outwardly of and flanking the outwardly facing surfaces, that are oblique with respect to the longitudinal electrode axis; and
the electrode end of the shunt defines a mounting surface adapted to seat on the flat oblique mounting surfaces of the electrode and operative when so seated to position the end portion of the shunt defining the electrode end of the shunt obliquely with respect to the longitudinal axis of the electrode.

13. An electrode for use with a weld gun including a frame structure, a weld arm mounted on the frame structure, an electrode mounted on the weld arm and including an electrode cap at one end of the electrode, a transformer, and a shunt fixedly secured at one end thereof to another end of the electrode and fixedly secured at another end thereof to the transformer, characterized in that:
the electrode is elongated and defines a longitudinal axis; and
the end of the electrode to which the shunt is secured defines opposite outwardly facing laterally spaced flat surfaces and flat surfaces, outwardly of and flanking the outwardly facing surfaces, that are oblique with respect to the longitudinal axis of the shunt.

14. An electrode according to claim 13 wherein:
the shunt end of the electrode defines a central portion defining the opposite outwardly facing laterally spaced flat surfaces; and
the flat oblique surfaces are defined outwardly of and flanking the central portion of the electrode.

15. An electrode according to claim 14 wherein:
the shunt end of the electrode has a circular cross-sectional configuration;
the outwardly facing surfaces are defined on chords of the circular cross-section; and
the oblique flat surfaces are defined as chordal segments of the circular cross-section.

16. An electrode according to claim 15 wherein the flat oblique surfaces lie in a plane perpendicular to the planes of the flat outwardly facing surfaces and oblique with respect to the longitudinal electrode axis.

17. An electrode according to claim 16 wherein the electrode further includes apertures for fastener means for passage through aligned apertures in the shunt end of the electrode and the electrode end of the shunt to fix the end portion of the shunt obliquely with respect to the longitudinal axis of the electrode.

18. A weld gun including a frame structure, a weld arm mounted on the frame structure, an electrode mounted on the weld arm and including an electrode cap at one end of the electrode, a transformer, and a shunt fixedly secured at one end thereof to another end of the electrode and fixedly secured at another end thereof to the transformer, characterized in that:

the electrode is elongated and defines a longitudinal axis;

the shunt end of the electrode defines a shunt mounting surface that is oblique with respect to the longitudinal electrode axis;

the electrode end of the shunt defines a mounting surface adapted to seat on the mounting surface of the electrode and operative when so seated to position the end portion of the shunt defining the electrode end of the shunt obliquely with respect to the longitudinal axis of the electrode;

the electrode end of the shunt has a bifurcated configuration defining opposite confronting laterally spaced flat surfaces;

the shunt end of the electrode defines opposite outwardly facing laterally spaced flat surfaces; and the distance between the laterally spaced flat surfaces on the electrode end of the shunt corresponds generally to the distance between the laterally spaced flat surfaces on the shunt end of the electrode so that the bifurcated end of the shunt may be swively positioned on the shunt end of the electrode.

19. A weld gun according to claim 18 wherein:

the shunt end of the electrode defines a central portion defining the opposite, outwardly facing laterally spaced flat surfaces and further defines flat oblique shunt mounting surfaces, outwardly of and flanking the outwardly facing surfaces, constituting the oblique shunt mounting surface; and the bifurcated electrode end of the shunt is mounted on the central portion of the shunt end of the electrode with the mounting surface on the shunt seated against the oblique shunt mounting surfaces on the shunt end of the electrode.

20. A weld gun according to claim 19 wherein:

the shunt end of the electrode has a circular cross-sectional configuration;

the outwardly facing surfaces are defined on chords of the circular cross-section; and the flat oblique surfaces are defined as chordal segments of the circular cross-section.

21. A weld gun according to claim 20 wherein the flat oblique surfaces lie in a plane that is perpendicular to the planes of the flat outwardly facing surfaces and oblique with respect to the longitudinal electrode axis.

22. A weld gun according to claim 21 wherein the weld gun further includes fastener means passing though aligned apertures in the shunt end of the electrode and the electrode end of the shunt to fix the end portion of the shunt obliquely with respect to the longitudinal axis of the electrode.

23. An electrode and shunt assembly for use with a weld gun including a frame structure, a weld arm mounted on the frame structure, an electrode mounted on the weld arm and including an electrode cap at one end of the electrode, a transformer, and a shunt fixedly secured at one end thereof to another end of the electrode and fixedly secured at another end thereof to the transformer, characterized in that;

the electrode is elongated and defines a longitudinal axis;

the shunt end of the electrode defines a shunt mounting surface that is oblique with respect to the longitudinal electrode axis;

the electrode end of the shunt defines a mounting surface adapted to seat on the mounting surface of the electrode and operative when so seated to position the end portion of the shunt defining the electrode end of the shunt obliquely with respect to the longitudinal axis of the electrode;

the shunt end of the electrode defines a central portion defining opposite outwardly facing laterally spaced fiat surfaces and further defines flat oblique surfaces, outwardly of and flanking the outwardly facing surfaces, constituting the oblique shunt mounting surface;

the end of the shunt secured to the electrode has a bifurcated configuration defining opposite confronting laterally spaced flat surfaces; and the distance between the laterally spaced flat surfaces on the end of the shunt corresponds generally to the distance between the laterally spaced flat surfaces on the central portion of the shunt end of the electrodes so that the bifurcated end of the shunt may be positioned on the central portion of the shunt end of the electrode with the mounting surface on the shunt seated against the oblique shunt mounting surfaces on the shunt end of the electrode.

24. An electrode and shunt assembly according to claim 23 wherein:

the shunt end of the electrode has a circular cross-sectional configuration;

the outwardly facing surfaces are defined as chords of the circular cross-section; and the flat oblique surfaces are defined as chordal segments of the circular cross-section.

25. An electrode and shunt assembly according to claim 24 wherein the flat oblique surfaces lie in a plane that is perpendicular to the planes of the flat outwardly facing surfaces and oblique with respect to the longitudinal electrode axis.

26. An electrode and shunt assembly according to claim 25 wherein the electrode and shunt assembly further includes fastener means passing through aligned apertures in the shunt end of the electrode and the electrode end of the shunt to fix the end portion of the shunt obliquely with respect to the longitudinal axis of the electrode.

* * * * *